(12) United States Patent
Gao et al.

(10) Patent No.: US 11,580,921 B2
(45) Date of Patent: Feb. 14, 2023

(54) LIQUID CRYSTAL DISPLAY AND DRIVING METHOD TO COMPENSATE A DEFORMATION AREA THEREOF

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Xianyong Gao, Beijing (CN); Shuai Hou, Beijing (CN); Xu Lu, Beijing (CN); Qiang Yu, Beijing (CN); Fanjian Zeng, Beijing (CN); Xinxin Wu, Beijing (CN); Fei Shang, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 745 days.

(21) Appl. No.: 16/096,984

(22) PCT Filed: Feb. 24, 2018

(86) PCT No.: PCT/CN2018/077072
§ 371 (c)(1),
(2) Date: Oct. 26, 2018

(87) PCT Pub. No.: WO2018/210024
PCT Pub. Date: Nov. 22, 2018

(65) Prior Publication Data
US 2021/0225300 A1    Jul. 22, 2021

(30) Foreign Application Priority Data
May 15, 2017    (CN) .......................... 201710340217.0

(51) Int. Cl.
*G09G 3/36* (2006.01)
(52) U.S. Cl.
CPC ... *G09G 3/3607* (2013.01); *G09G 2320/0626* (2013.01)
(58) Field of Classification Search
CPC ..................... G09G 3/3607; G09G 2320/0626
See application file for complete search history.

(56) References Cited

U.S. PATENT DOCUMENTS

| 4,698,843 A * | 10/1987 | Burt ..................... H04N 19/895 |
| | | 708/308 |
| 2008/0284794 A1 * | 11/2008 | Wang ................... G09G 3/3688 |
| | | 345/618 |

(Continued)

FOREIGN PATENT DOCUMENTS

| CN | 103198801 A | 7/2013 |
| CN | 105259687 A | 1/2016 |

(Continued)

OTHER PUBLICATIONS

The International Search Report and Written Opinion dated May 30, 2018; PCT/CN2018/077072.

*Primary Examiner* — William Boddie
*Assistant Examiner* — Bipin Gyawali (57) ABSTRACT

A liquid crystal display (LCD) and a driving method thereof are disclosed. The LCD includes: an LCD panel, a grayscale voltage output portion and a grayscale voltage adjusting portion. The LCD panel includes a deformation area formed by bonding of a driver integrated circuit, and the deformation area includes a first subpixel. The grayscale voltage output portion is configured to output a first grayscale voltage to the first subpixel. The grayscale voltage adjusting portion is configured to adjust the first grayscale voltage into a second grayscale voltage, so that a brightness of the first (Continued)

subpixel at the second grayscale voltage is less than a brightness of the first subpixel at the first grayscale voltage.

10 Claims, 5 Drawing Sheets

(56) References Cited

U.S. PATENT DOCUMENTS

| | | | | |
|---|---|---|---|---|
| 2011/0144482 | A1* | 6/2011 | Sendai | G06T 7/0012 |
| | | | | 600/425 |
| 2012/0071056 | A1* | 3/2012 | Oka | B23K 26/361 |
| | | | | 445/2 |
| 2014/0176524 | A1* | 6/2014 | Lee | G09G 3/3233 |
| | | | | 345/212 |
| 2014/0210841 | A1* | 7/2014 | Song | G09G 5/02 |
| | | | | 345/589 |
| 2014/0253602 | A1 | 9/2014 | Wu et al. | |
| 2018/0190218 | A1* | 7/2018 | Jang | G09G 3/3611 |
| 2018/0218662 | A1 | 8/2018 | Hu et al. | |
| 2020/0302892 | A1* | 9/2020 | Qin | G02F 1/13338 |
| 2020/0400589 | A1* | 12/2020 | Feldman | G06T 7/0008 |

FOREIGN PATENT DOCUMENTS

| | | |
|---|---|---|
| CN | 105679265 A | 6/2016 |
| CN | 106339128 A | 1/2017 |
| CN | 106531050 A | 3/2017 |
| CN | 106918935 A | 7/2017 |
| JP | 2009-216852 A | 9/2009 |

* cited by examiner

LIQUID CRYSTAL DISPLAY AND DRIVING METHOD TO COMPENSATE A DEFORMATION AREA THEREOF

CROSS-REFERENCE TO RELATED APPLICATION

The present application claims priority to the Chinese patent application No. 201710340217.0, filed on May 15, 2017, the entire disclosure of which is incorporated herein by reference as part of the present application.

TECHNICAL FIELD

At least one embodiment of the present disclosure relates to a liquid crystal display (LCD) and a driving method thereof.

BACKGROUND

Liquid crystal display (LCD), as one of flat panel displays, has been widely applied in various fields and has the advantages of low power consumption, thin and light weight, etc. For example, the LCD includes an LCD panel. The LCD includes an array substrate, an opposing substrate which is cell-assembled with the array substrate, and a liquid crystal layer disposed between the array substrate and the opposing substrate. The array substrate may include a pixel electrode. A common electrode may be formed on the array substrate or the opposing substrate. A color filter (CF) may be disposed on the opposing substrate. The pixel electrode and the common electrode may be configured to form an electric field to drive liquid crystal molecules to rotate, so the transmittance of incident light can be controlled, and then the bright and dark control of the LCD panel can be realized, and finally image display can be realized.

SUMMARY

At least one embodiment of the present disclosure relates to a liquid crystal display (LCD) and a driving method thereof.

At least one embodiment of the present disclosure provides a liquid crystal display (LCD), comprising:

an LCD panel, comprising a deformation area formed by bonding of a driver integrated circuit (IC), the deformation area comprising a first subpixel;

a grayscale voltage output portion, configured to output a first grayscale voltage to the first subpixel; and a grayscale voltage adjusting portion, configured to adjust the first grayscale voltage into a second grayscale voltage, so that a brightness of the first subpixel at the second grayscale voltage is less than a brightness of the first subpixel at the first grayscale voltage.

According to the LCD provided by one or more embodiments of the present disclosure, the grayscale voltage adjusting portion is configured to allow the brightness of the first subpixel at the second grayscale voltage to be minimum.

According to the LCD provided by one or more embodiments of the present disclosure, the LCD panel further comprises a non-deformation area, the non-deformation area comprises a second subpixel, and the grayscale voltage adjusting portion is configured to allow the brightness of the first subpixel at the second grayscale voltage to be equal to or close to a brightness of the second subpixel at the first grayscale voltage.

According to the LCD provided by one or more embodiments of the present disclosure, the grayscale voltage output portion is further configured to output a third grayscale voltage to the second subpixel, and the third grayscale voltage is equal to the first grayscale voltage, and if the brightness of the first subpixel at the second grayscale voltage is different from the brightness of the second subpixel at the first grayscale voltage, the grayscale voltage adjusting portion is further configured to adjust the third grayscale voltage into a fourth grayscale voltage, so that a brightness of the second subpixel at the fourth grayscale voltage is the same as the brightness of the first subpixel at the second grayscale voltage.

According to the LCD provided by one or more embodiments of the present disclosure, the deformation area comprises a plurality of deformation sub-areas, a same deformation sub-area has a same deformation degree, and the grayscale voltage adjusting portion is configured to allow the second grayscale voltages of the first subpixels at a same grayscale in a same deformation sub-area to be same, and allow the second grayscale voltages of the first subpixels at a same grayscale in different deformation sub-areas to be different.

According to the LCD provided by one or more embodiments of the present disclosure, the LCD further comprises a first subpixel coordinate recording portion of the deformation area, wherein the first subpixel coordinate recording portion of the deformation area is configured to record a coordinate of the first subpixel in the deformation area.

According to the LCD provided by one or more embodiments of the present disclosure, the LCD further comprises a memory, wherein the memory is configured to store the second grayscale voltage corresponding to the first grayscale voltage, the second grayscale voltage is a grayscale voltage at which the brightness of the first subpixel is less than the brightness of the first subpixel at the first grayscale voltage, and the grayscale voltage is obtained by an offline test.

At least one embodiment of the present disclosure further provides a driving method of a liquid crystal display (LCD), an LCD panel comprising a deformation area formed by bonding of a driver integrated circuit (IC), the deformation area comprising a first subpixel, the method comprising:

outputting a first grayscale voltage to the first subpixel; and adjusting the first grayscale voltage into a second grayscale voltage, so that a brightness of the first subpixel at the second grayscale voltage is less than a brightness of the first subpixel at the first grayscale voltage.

According to the driving method of the LCD provided by one or more embodiments of the present disclosure, the brightness of the first subpixel at the second grayscale voltage is minimum.

According to the driving method of the LCD provided by one or more embodiments of the present disclosure, the LCD panel further comprising a non-deformation area, and the non-deformation area comprising a second subpixel, the method further comprising allowing the brightness of the first subpixel at the second grayscale voltage to be equal to or close to a brightness of the second subpixel at the first grayscale voltage.

According to the driving method of the LCD provided by one or more embodiments of the present disclosure, the driving method further comprises outputting a third grayscale voltage to the second subpixel, the third grayscale voltage being equal to the first grayscale voltage, and if the brightness of the first subpixel at the second grayscale voltage is different from the brightness of the second subpixel at the first grayscale voltage, adjusting the third grayscale voltage into a fourth grayscale voltage, so that a brightness of the second subpixel at the fourth grayscale voltage is the same as the brightness of the first subpixel at the second grayscale voltage.

According to the driving method of the LCD provided by one or more embodiments of the present disclosure, the driving method further comprises dividing the deformation area into different deformation sub-areas according to deformation degree, wherein a same deformation sub-area has a same deformation degree, the second grayscale voltages of the first subpixels at a same grayscale in the same deformation sub-area are same, and the second grayscale voltages of the first subpixels at a same grayscale in different deformation sub-areas are different.

According to the driving method of the LCD provided by one or more embodiments of the present disclosure, the driving method further comprises determining the deformation sub-areas by a simulation method, wherein the simulation method comprises: providing a deformation threshold according to a bonding parameter, and allowing an area within the deformation threshold to form a same deformation sub-area.

According to the driving method of the LCD provided by one or more embodiments of the present disclosure, the driving method further comprises recording a coordinate of the first subpixel in the deformation area.

According to the driving method of the LCD provided by one or more embodiments of the present disclosure, the driving method further comprises performing an offline test to obtain the second grayscale voltage corresponding to the first grayscale voltage at each grayscale, wherein the second grayscale voltage is a grayscale voltage at which the brightness of the first subpixel is less than the brightness of the first subpixel at the first grayscale voltage, and the grayscale voltage is obtained by an offline test.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some embodiments of the present disclosure and thus are not limitative of the present disclosure.

DETAILED DESCRIPTION

In order to make objects, technical details and advantages of the embodiments of the present disclosure apparent, the technical solutions of the embodiments will be described in a clearly and fully understandable way in connection with the drawings related to the embodiments of the present disclosure. Apparently, the described embodiments are just a part but not all of the embodiments of the present disclosure. Based on the described embodiments herein, those skilled in the art can obtain other embodiment(s), without any inventive work, which should be within the scope of the present disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various parts. Also, the terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In a chip on glass (COG) display panel where a driver integrated circuit (IC) is directly bonded to glass, due to the bonding of the COG driver IC, an array substrate and an opposing substrate are deformed. Due to the reasons such as deformation and/or interference, the light leakage problem of the display panel at a low grayscale can be caused. At zero grayscale (L0), light leakage problem is more obvious. The proposal of overall increase on brightness at the low grayscale can be adopted to solve the problem of light leakage, but it will damage the contrast of the entire display panel. Or the chip on film (COF) proposal of fixing a driver IC on a flexible printed circuit (FPC) board can be adopted, but the cost will be increased.

In an LCD, the driver IC bonded in the form of COG is directly bonded to the display panel. As the temperature, the pressure, the material and the like at the time of bonding are consistent in mass production, the display panel will be deformed, and then the light leakage phenomenon can be caused.

Figure 1:
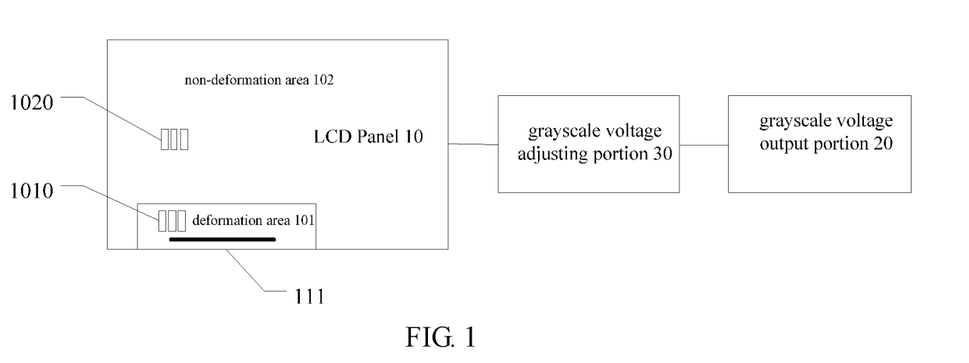
FIG. 1 is a schematic diagram of an LCD provided by an embodiment of the present disclosure.

As illustrated in FIG. 1, at least one embodiment of the present disclosure provides an LCD, which includes:

an LCD panel 10, including a deformation area 101 formed by bonding of a driver integrated circuit (IC) 11, the deformation area 101 including a first subpixel 1010;

a grayscale voltage output portion 20, configured to output a first grayscale voltage V1 to the first subpixel 1010; and a grayscale voltage adjusting portion 30, configured to adjust the first grayscale voltage V1 into a second grayscale voltage V2, so that a brightness of the first subpixel 1010 at the second grayscale voltage V2 is less than a brightness of the first subpixel 1010 at the first grayscale voltage V1. For example, after the first grayscale voltage V1 is adjusted into the second grayscale voltage V2, the second grayscale voltage is outputted by the grayscale voltage output portion 20.

In the LCD provided by at least one embodiment of the present disclosure, the brightness of the deformation area 101 is reduced, so the light leakage of the display panel can be reduced.

As illustrated in FIG. 1, the LCD panel 10 further includes a non-deformation area 102, and the non-deformation area 102 includes a second subpixel 1020. The deformation area 101 may include a plurality of first subpixels 1010, and the non-deformation area 102 may include a plurality of second subpixels 1020. Not all the first subpixels 1010 and the second subpixels 1020 are illustrated in FIG. 1.

Figure 2:
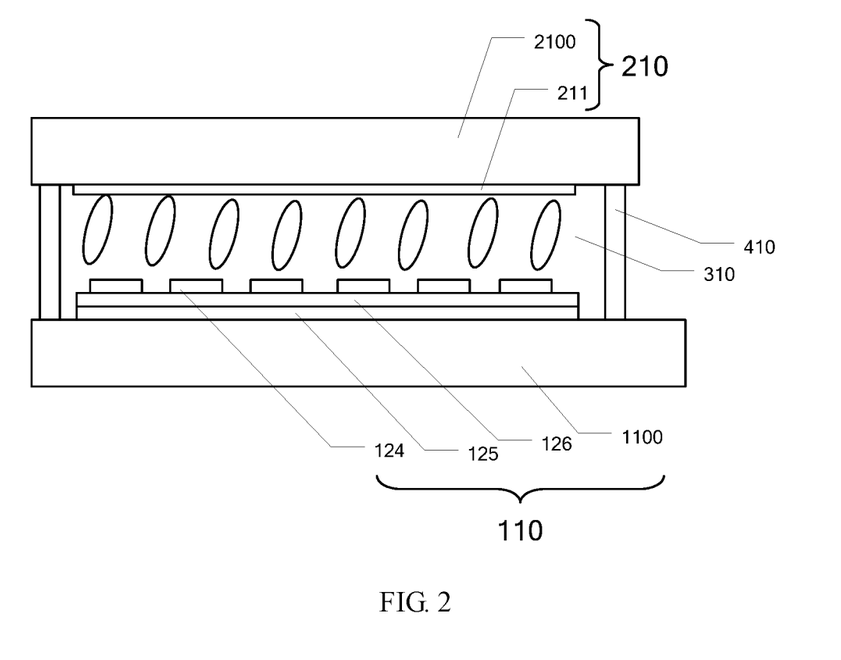
FIG. 2 is a schematic sectional view of an LCD.

As illustrated in FIG. 2, the LCD panel 10 may include an array substrate 110, an opposing substrate 210, and a liquid crystal layer 310 disposed between the array substrate 110 and the opposing substrate 210. The array substrate 110 and the opposing substrate 210 may be sealed by sealant 410 to form a liquid crystal cell to seal the liquid crystal layer 310 in the liquid crystal cell. The array substrate 110 may include a first base substrate 1100, and the opposing substrate 210 may include a second base substrate 2100. The complete structure of the LCD panel 10 is not illustrated in FIG. 2, and other structures may be set as required. Other structures, for example, include thin film transistors (TFTs), alignment films and the like, but are not limited thereto. For example, the driver IC 111 may be bonded to the array substrate. For example, the driver IC 111 may be bonded to an area outside a pixel region of the array substrate.

Description is given in FIG. 2 by taking a display panel with advanced super dimension switching (ADS) mode as an example. A pixel electrode 124 and a common electrode 125 are both disposed on the first base substrate 1100. The pixel electrode 124 and the common electrode 125 are insulated from each other and configured to form an electric field to drive liquid crystal molecules to rotate so as to achieve display. An insulation layer 126 may be disposed between the pixel electrode 124 and the common electrode 125. The slit pixel electrode 124 may be disposed on the planar common electrode 125, and the pixel electrode 124 and the common electrode 125 may form a multidimensional electric field. For example, a CF layer 211 may be disposed on the second base substrate 2100, so as to realize color display, but the position of the CF layer is not limited thereto.

Figure 3:
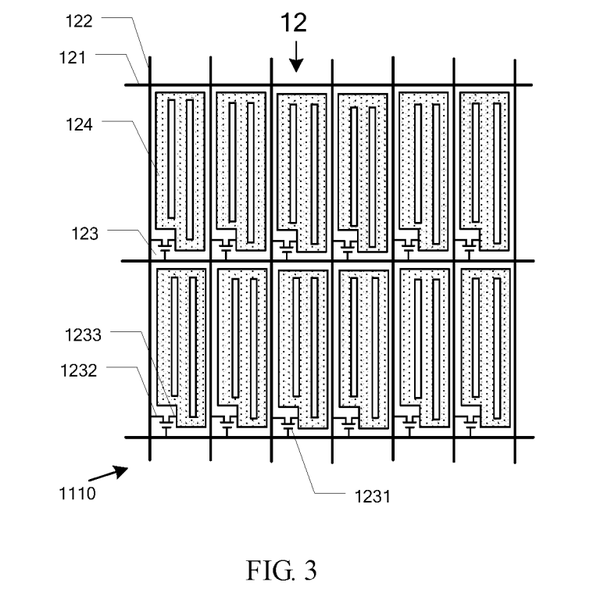
FIG. 3 is a schematic top view of an LCD.

As illustrated in FIG. 3, the array substrate may include a plurality of gate lines 121 and a plurality of data lines 122 disposed on the first base substrate 1100. The plurality of gate lines 121 may be parallel with each other. The plurality of data lines 122 may be parallel with each other. The plurality of gate lines 121 are insulated from and intersected with the plurality of data lines 122. For example, the plurality of gate lines 121 may be perpendicular to the plurality of data lines 122. The plurality of gate lines 121 may be insulated from the plurality of data lines 122 by providing an insulation layer therebetween.

Figure 4:
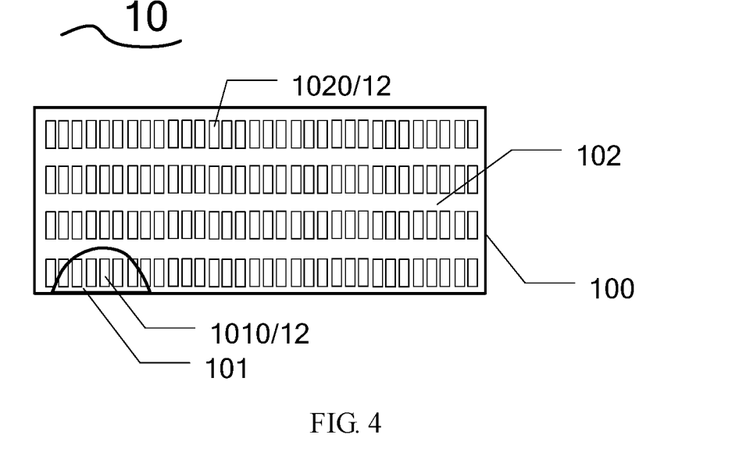
FIG. 4 is a schematic diagram of an array of subpixels of an LCD.

As illustrated in FIG. 3, the array substrate further includes a thin film transistor (TFT) 123. The TFT 123 includes a gate electrode 1231, an active layer (not illustrated in the figure), a source electrode 1232 and a drain electrode 1233. Both the source electrode 1232 and the drain electrode 1233 are electrically insulated from the gate electrode 1231. The gate electrode 1231 is electrically insulated from the active layer. The source electrode 1232 and the drain electrode 1233 may be respectively connected with the active layer. The source electrode 1232 and the drain electrode 1233 are electrically connected when the TFT is switched on and insulated from each other when the TFT is not switched on. The gate electrode 1231 is electrically connected with the gate line 121. The source electrode 1232 is electrically connected with the data line 122. The drain electrode 1233 is electrically connected with the pixel electrode 124. The gate line 121 is configured to input an on or off signal into the gate electrode 1231 of the TFT 123, so as to switch on or off the TFT 123. The data line 122 is configured to input a data voltage (grayscale voltage, driving voltage) into the pixel electrode 124 through the TFT in the on state, so that subpixel 12 can display different grayscales (the grayscale voltage runs through the source electrode 1232, the active layer and the drain electrode 1233 and arrives at the pixel electrode 124). The plurality of gate lines 121 and the plurality of data lines 122 are intersected with each other to define a plurality of subpixels 12, but limitations are not imposed thereto. A subpixel 12 generally includes a gate line 121, a data line 122, a TFT 123 and a pixel electrode 124. The subpixel 12 may be the first subpixel 1010 or the second subpixel 1020. The first subpixel 1010 and the second subpixel 1020 are distinguished as being disposed at different areas. FIG. 4 illustrates a plurality of subpixel 12 arranged in an array.

Description is given in the embodiment of the present disclosure by taking the pixel structure as illustrated in FIG. 3 as an example, but not limited thereto. The pixel structure may be set as required.

According to the LCD provided by an embodiment of the present disclosure, because the display panel at zero grayscale (L0) has obvious light leakage problem, when the display panel displays an L0 image, the grayscale voltage adjusting portion 30 may be configured to allow the brightness of the first subpixel 1010 at the second grayscale voltage V2 to be minimum, so as to maximally reduce the difference between the brightness of the deformation area and the brightness of the non-deformation area.

According to the LCD provided by an embodiment of the present disclosure, in order to better reduce the light leakage of the deformation area 101, the grayscale voltage adjusting portion 30 may be configured to allow the brightness of the first subpixel 1010 at the second grayscale voltage V2 to be equal to or maximally close to the brightness of the second subpixel 1020 at the first grayscale voltage V1.

For example, the second grayscale voltage V2 may be obtained by an offline test. All the first subpixels 1010 of the deformation area 101 and all the second subpixels 1020 of the non-deformation area 102 may be set to be at the first grayscale (the same grayscale) V1. At the first grayscale voltage V1, because the deformation area 101 is deformed and has the problem of light leakage, a brightness of the deformation area 101 is greater than a brightness of the non-deformation area 102, so the first grayscale voltage V1 of the first subpixel 1010 of the deformation area 101 may be adjusted into a second grayscale voltage V2, so that the brightness of the first subpixel 1010 at the second grayscale voltage V2 can be equal to or maximally close to a brightness of the second subpixel 1020 at the first grayscale voltage V1, and then the value of the second grayscale voltage V2 can be obtained. For example, the grayscale range may be 0-255, 256 grayscales in total, and each grayscale has a corresponding second grayscale voltage V2. The good effect of reducing light leakage can be achieved at a low grayscale. But the effect of reducing light leakage can also be achieved at a high grayscale. The range of the low grayscale is not limited in the embodiment of the present disclosure. The grayscales of the subpixel may be determined according to an image to be displayed, and each subpixel may be in different grayscales.

According to the LCD provided by an embodiment of the present disclosure, in order to reduce the difference between the brightness of the first subpixel in the deformation area 101 and the brightness of the second subpixel in the non-deformation area 102, the grayscale voltage output portion 20 is further configured to output a third grayscale voltage V3 to the second subpixel 1020. The third grayscale voltage V3 is equal to the first grayscale voltage V1. If the brightness of the first subpixel 1010 at the second grayscale voltage V2 is different from the brightness of the second subpixel 1020 at the first grayscale voltage V1, the grayscale voltage adjusting portion 30 is further configured to adjust the third grayscale voltage V3 into a fourth grayscale voltage V4, so that a brightness of the second subpixel 1020 at the fourth grayscale voltage V4 can be the same as the brightness of the first subpixel 1010 at the second grayscale voltage V2. The third grayscale voltage V3 is inputted into the second subpixel 1020 of the non-deformation area. If the non-deformation area includes a second subpixel 1020 of which the third grayscale voltage V3 is equal to the first grayscale voltage V1, the method given in the embodiment may be adopted to reduce the difference between the brightness of the first subpixel in the deformation area 101 and the brightness of the second subpixel in the non-deformation area 102 at the same grayscale voltage. If the third grayscale voltages V3 inputted into all the second subpixels 1020 of the non-deformation area are not equal to the first grayscale voltage V1, the steps given in the embodiment may be omitted. The grayscale voltage inputted into each subpixel may be determined according to a displayed image.

For example, if a brightness of the deformation area 101 is 15 nit and a brightness of the non-deformation area 102 is 10 nit in an image at a predetermined grayscale (e.g., L0 grayscale), a general method is to adjust the grayscale voltage so that the brightness of the deformation area 101 and the brightness of the non-deformation area 102 can be consistent and are both 15 nit. In the embodiment of the present disclosure, the brightness of the deformation area may be reduced by adjusting the first grayscale voltage V1 into the second grayscale voltage V2. For example, the brightness of the deformation area may be adjusted into 11 nit. Because the brightness of the deformation area 101 is still greater than the brightness of the non-deformation area 102, the brightness can be integrally increased, namely adjusting the third grayscale voltage V3 into a fourth grayscale voltage V4, so that the brightness of the non-deformation area 102 can be adjusted to be consistent with the brightness of the deformation area 101 (for example, the brightness of the non-deformation area 102 is adjusted to be the lowered brightness of the non-deformation area, e.g., 11 nit), and then light leakage can be better reduced. If the deformation area 101 and the non-deformation area 102 include a plurality of grayscales, the grayscale voltage of subpixels at the same grayscale may be adjusted, respectively. Repeated portions will be omitted here.

It should be understood that the step of adjusting the third grayscale voltage V3 into the fourth grayscale voltage V4 may also be omitted.

For example, the grayscale voltage output portion 20 may be configured to output a grayscale voltage to each of the subpixels in the display panel, and all the subpixels include a plurality of first subpixels 1010 in the deformation area 101 and a plurality of second subpixels 1020 in the non-deformation area 102.

Figure 5:
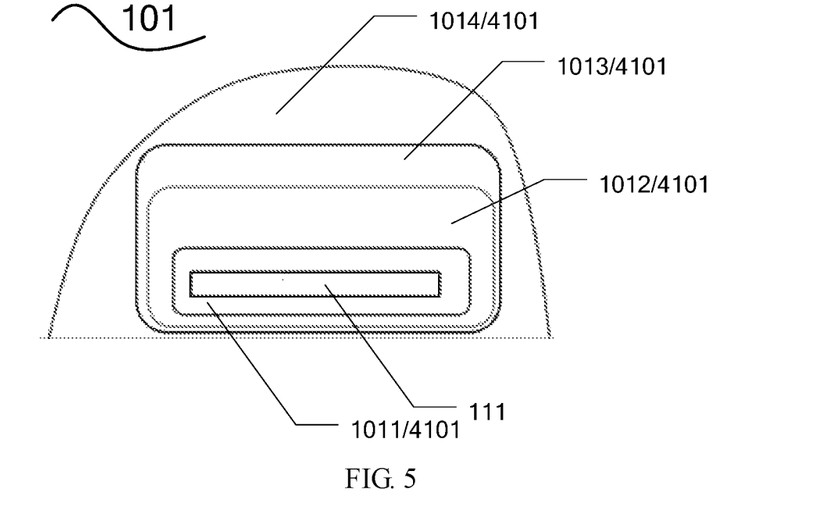
FIG. 5 is a schematic diagram of a deformation area of an LCD provided by an embodiment of the present disclosure.

According to the LCD provided by an embodiment of the present disclosure, as illustrated in FIG. 5, the deformation area 101 includes a plurality of deformation sub-areas 4101. The same deformation sub-area 4101 has same deformation degree. The grayscale voltage adjusting portion 30 is configured to allow the second grayscale voltages V2 of the first subpixels 1010 at the same grayscale in the same deformation sub-area 4101 to be same and allow the second grayscale voltages V2 of the first subpixels 1010 at the same grayscale in different deformation sub-areas 4101 to be different. FIG. 5 illustrates a first deformation sub-area 1011, a second deformation sub-area 1012, a third deformation sub-area 1013 and a fourth deformation sub-area 1014, four deformation sub-areas 4101 in total, and the deformation degrees are gradually decreased from the first deformation sub-area 1011 to the fourth deformation sub-area 1014. In general, the deformation degrees are gradually decreased from an area close to the bonded driver IC 111 to an area away from the bonded driver IC 111. Description is given in the embodiment by taking the case that the deformation area 101 includes four deformation sub-areas 4101 as an example. The deformation sub-areas 4101 may also be in other numbers.

Figure 6:
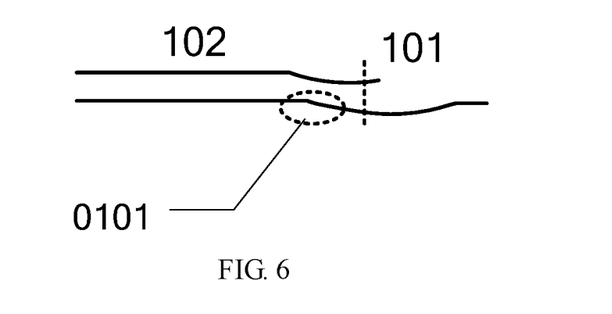
FIG. 6 is a schematic diagram illustrating light leakage of an LCD.

As illustrated in FIG. 6, a vertical dotted line position is a position of the bonded driver IC 111; an oval dotted border refers to a light leakage area 0101; and the display panel includes a deformation area 101 and a non-deformation area 102.

Figure 7:
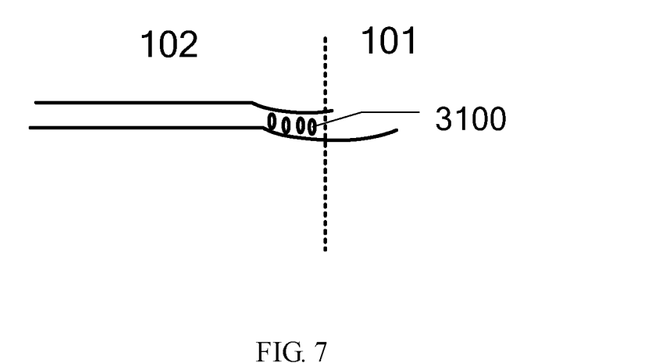
FIG. 7 is a schematic diagram illustrating the case that different deformation sub-areas of an LCD adopt same grayscale voltage to reduce light leakage.

As illustrated in FIG. 7, the grayscale voltages of the first subpixels 1010 at the same grayscale at various positions of the deformation area 101 is same. That is to say, the second grayscale voltages V2 of the deformation sub-areas 4101 with different deformation amounts are all the same, so the rotation degrees of liquid crystal molecules 3100 in the liquid crystal layer 310 is same. Because different deformation sub-areas 4101 have different deformation amounts, different deformation sub-areas 4101 does not have the same brightness (partial deformation sub-areas 4101 have light leakage problem), so the brightness of the deformation area 101 cannot be well reduced according to the deformation degree.

Figure 8:
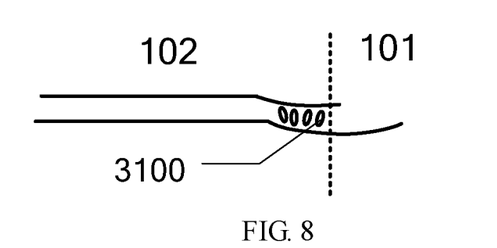
FIG. 8 is a schematic diagram illustrating the case that different deformation sub-areas of an LCD provided by an embodiment of the present disclosure adopt different grayscale voltages to reduce light leakage.

As illustrated in FIG. 8, in the LCD provided by the embodiment of the present disclosure, the second grayscale voltages V2 of the first subpixels 1010 at the same grayscale in different deformation sub-areas 4101 are different, so the rotation degrees of the liquid crystal molecules 3100 in different deformation sub-areas 4101 are different. Thus, the brightness of each deformation sub-area 4101 may be independently adjusted according to the deformation amount, so the brightness of each deformation sub-area 4101 can be well reduced, and then light leakage can be further reduced.

For example, taking an L0 grayscale image as an example, grayscale voltages (rotation voltages) when different deformation sub-areas 4101 are the darkest (the brightness is the minimum) may be determined. When the deformation section is exactly parallel with a light path of light through rotation of liquid crystal molecules, it is the darkest for the LCD with ADS mode. The LCD is subjected to an offline test; the grayscale voltage for rotating liquid crystal molecules is adjusted; and a grayscale voltage allowing a corresponding deformation area to be in the darkest state may be measured by a brightness detecting device. Because the bonding process is stable in mass production, at the L0 grayscale, corresponding deformation sub-areas adopt a corresponding grayscale voltage.

A solution to solve L0 light leakage problem is as following: according to a light transmission model of liquid crystal molecules in the display panel, the liquid crystal transmittance of the deformation area may be all minimum by applying grayscale voltages at different levels (grayscale voltages of different sizes) to the deformation area. The solution to solve L0 light leakage problem may also include: based on the brightest part in the deformation areas, controlling the brightness of the entire display panel to achieve the even darkest effect. The adjustment at other grayscales may refer to the solution to solve L0 light leakage problem.

Figure 9:
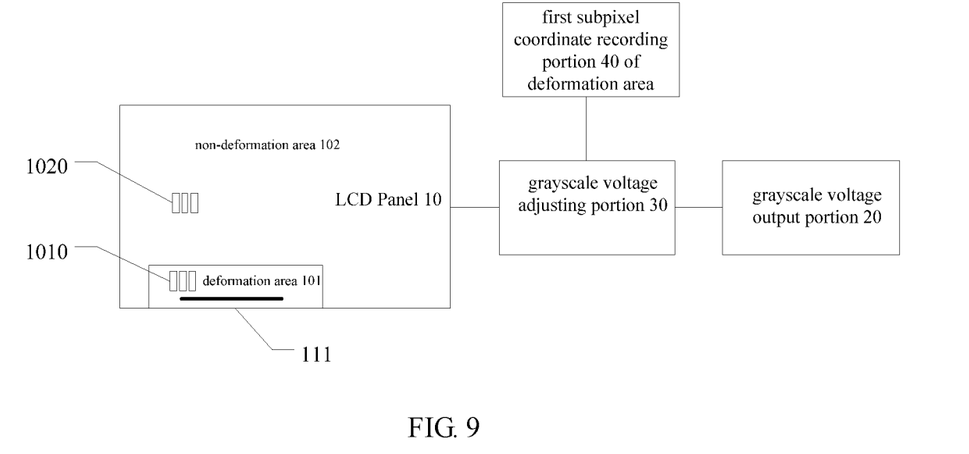
FIG. 9 is a schematic diagram of an LCD provided by another embodiment of the present disclosure.

The LCD provided by an embodiment of the present disclosure, as illustrated in FIG. 9, further includes a first subpixel coordinate recording portion 40 of the deformation area. The first subpixel coordinate recording portion 40 of the deformation area is configured to record a coordinate of the first subpixel 1010 in the deformation area 101, so as to adjust the grayscale voltage of the first subpixel 1010 in the deformation area 101.

For example, the LCD provided by an embodiment of the present disclosure further includes a second subpixel coordinate recording portion of the non-deformation area. The second subpixel coordinate recording portion of the non-deformation area is configured to record a coordinate of the second subpixel 1020 in the non-deformation area 101, so as to adjust the grayscale voltage of the second subpixel 1020 in the non-deformation area 101.

For example, the LCD provided by an embodiment of the present disclosure may further include a subpixel coordinate recording portion which may be configured to record a coordinate of the subpixel. The subpixel herein may include at least one of the first subpixel or the second subpixel.

Figure 10:
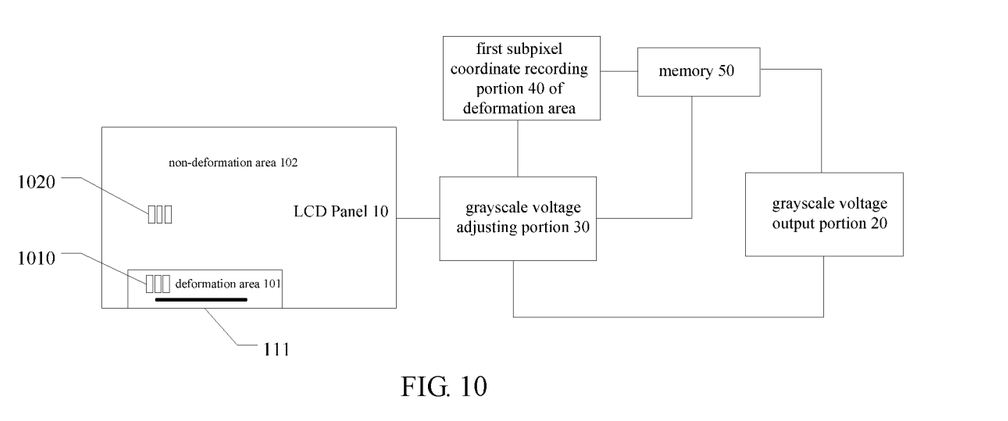
FIG. 10 is a schematic diagram of an LCD provided by another embodiment of the present disclosure.

The LCD provided by an embodiment of the present disclosure, as illustrated in FIG. 10, further includes a memory 50. The memory 50 is configured to store the second grayscale voltage V2 corresponding to the first grayscale voltage V1. The second grayscale voltage V2 is a grayscale voltage at which the brightness of the first subpixel 1010 is less than the brightness of the first subpixel 1010 at the first grayscale voltage V1, and the grayscale voltage is obtained by an offline test. The memory 50 may be further configured to store the coordinate of the first subpixel in the deformation area, the coordinate of the second subpixel in the non-deformation area, and the grayscale voltage outputted by the grayscale voltage output portion, etc.

Figure 11:
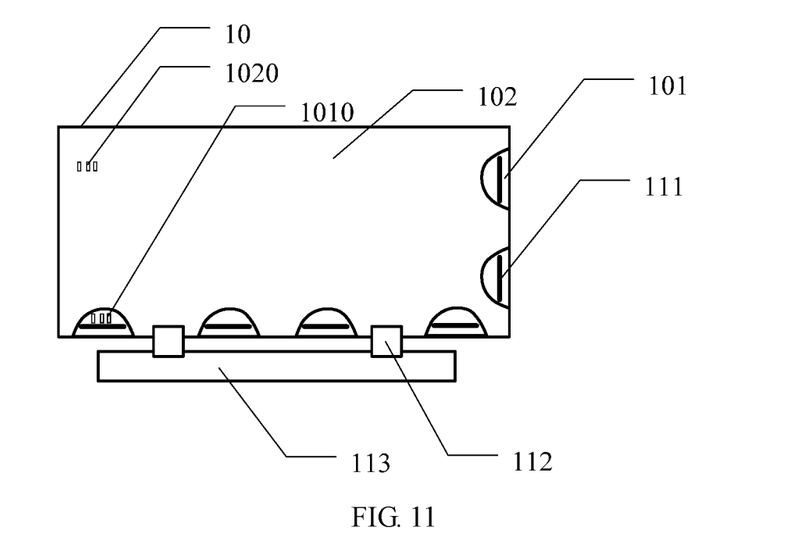
FIG. 11 is a schematic diagram of an LCD provided by another embodiment of the present disclosure.

For example, FIG. 11 illustrates a plurality of deformation areas 101. Due to same bonding parameters, the deformation of the plurality of deformation areas 101 is almost consistent. The proposal of reducing light leakage of each deformation area may refer to the above description.

As illustrated in FIG. 11, in some embodiments, the LCD further includes an FPC 112 and a printed circuit board assembly (PCBA).

At least one embodiment of the present disclosure further provides a driving method of an LCD. An LCD panel 10 includes a deformation area 101 formed due to the bonding of a driver IC 111. The deformation area 101 includes a first subpixel 1010. The method includes:

outputting a first grayscale voltage V1 to the first subpixel 1010; and adjusting the first grayscale voltage V1 into a second grayscale voltage V2, so that a brightness of the first subpixel 1010 at the second grayscale voltage V2 is less than a brightness of the first subpixel 1010 at the first grayscale voltage V1.

In the driving method of the LCD provided by at least one embodiment of the present disclosure, the brightness of the first subpixel 1010 at the second grayscale voltage V2 is the minimum.

According to the driving method of the LCD provided by at least one embodiment of the present disclosure, the LCD panel 10 further includes a non-deformation area 102. The non-deformation 102 includes a second subpixel 1020. The method further includes allowing the brightness of the first subpixel 1010 at the second grayscale voltage V2 to be equal to or close to the brightness of the second subpixel 1020 at the first grayscale voltage V1.

According to the driving method of the LCD provided by at least one embodiment of the present disclosure, the mothed further includes outputting a third grayscale voltage V3 to the second subpixel 1020, if the brightness of the first subpixel 1010 at the second grayscale voltage V2 is different from a brightness of the second subpixel 1020 at the first grayscale voltage V1, adjusting the third grayscale voltage V3 into a fourth grayscale voltage V4, so that a brightness of the second subpixel 1020 at the fourth grayscale voltage V4 is the same as the brightness of the first subpixel 1010 at the second grayscale voltage V2.

The driving method of the LCD, provided by at least one embodiment of the present disclosure, further includes dividing the deformation area 101 into different deformation sub-areas 4101 according to deformation degree. The same deformation sub-area 4101 has same deformation degree. The second grayscale voltages V2 of the first subpixels 1010 at the same grayscale in the same deformation sub-area 4101 is same, and the second grayscale voltages V2 of the first subpixels 1010 at the same grayscale in different deformation sub-areas 4101 are different.

The driving method of the LCD, provided by at least one embodiment of the present disclosure, further includes determining the deformation sub-areas 4101 by a simulation method. The simulation method includes: providing a deformation threshold according to a bonding parameter, and allowing an area within the deformation threshold to form a same deformation sub-area 4101.

For example, the simulation method may include following steps: creating a bending model of the deformation area, and collecting a parameter, in which the parameter, for example, includes parameters relevant to a material, such as materials of following: the display panel, the anisotropic conductive film (ACF) adhesive and the driver IC bonded by COG, and parameters relevant to process such as bonding pressure and temperature. Simulation software and the like may be adopted to simulate this model, so as to obtain the deformation area. A threshold may also be set, and an area within which the deformation amount is within the threshold is considered as a deformation sub-area.

For example, the corresponding relationship between the deformation area or the deformation sub-area and a row-and-column coordinate may be obtained by the following ways.

Figure 12:
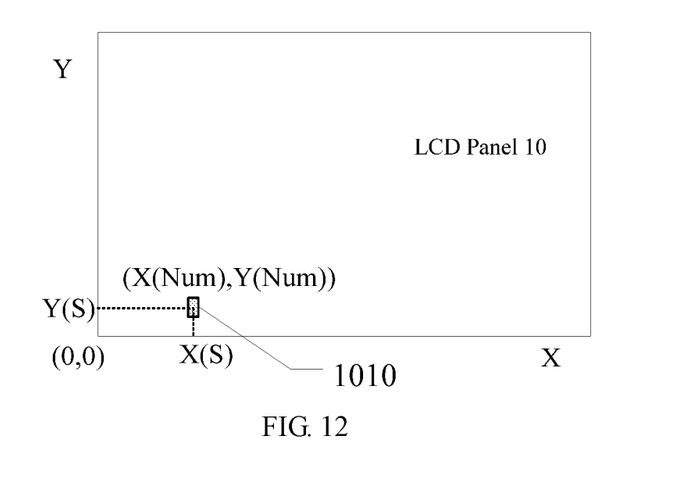
FIG. 12 is a schematic diagram of a coordinate of a first subpixel of an LCD provided by another embodiment of the present disclosure.

As illustrated in FIG. 12, actual physical size may be utilized to calculate a corresponding position of a row-and-column coordinate. A distance between the first subpixel 1010 and an X axis is Y(S), and a distance between the first subpixel 1010 and a Y axis is X(S). Supposing an actual row-and-column physical size of the first subpixel is [X(p), Y(p)], an simulation area is [X(S), Y(S)], and then a corresponding row-and-column coordinate is [X(Num), Y(Num)], in which X(p) and Y(p) refer to physical size of the display panel; [X(S), Y(S)] refers to a length of the area that is actually deformed during the simulation. X(Num)=X(S)/X(p); and Y(Num)=Y(S)/Y(p). After the coordinates of the first subpixels are obtained, the coordinates of the subpixels required to be adjusted the grayscale voltages in each area may be recorded in turn. The coordinates of the second subpixels may be obtained by a similar method.

The driving method of the LCD, provided by at least one embodiment of the present disclosure, further includes recording a coordinate of the first subpixel 1010 in the deformation area 101.

The driving method of the LCD, provided by at least one embodiment of the present disclosure, further includes performing an offline test to obtain the second grayscale voltage V2 corresponding to the first grayscale voltage V1 of the first subpixel 1010 at each grayscale. The second grayscale voltage V2 is a grayscale voltage at which the brightness of the first subpixel 1010 is less than the brightness of the first subpixel 1010 at the first grayscale voltage V1, and the grayscale voltage is obtained by the offline test. Each grayscale has a corresponding first grayscale voltage V1, and each deformation area/deformation sub-area has a corresponding second grayscale voltage V2 at the grayscale.

Same or similar parts in the LCD and the driving method of the LCD, provided by the embodiments of the present disclosure, may refer to each other. Repeated portions will be omitted here.

In the embodiment of the present disclosure, the function of the grayscale voltage output portion may be realized by the driver IC.

The LCD provided by the embodiment of the present disclosure may further include one or more processors and one or more memories. The processor may process data signals, and may include various computing architectures such as a complex instruction set computer (CISC) architecture, a reduced instruction set computer (RISC) architecture, or an architecture for implementing a combination of multiple instruction sets. The memory may store instructions and/or data executed by the processor. The instructions and/or data may include codes which are configured to achieve some functions or all the functions of one or more parts in the embodiments of the present disclosure. For example, the memory includes a dynamic random access memory (DRAM), a static random access memory (SRAM), a flash memory, an optical memory or other memories well known to those skilled in the art.

In some embodiments of the present disclosure, the grayscale voltage adjusting portion includes codes and programs stored in the memory; and the processor may execute the codes and the programs to realize some functions or all the functions of the grayscale voltage adjusting portion as described above.

In some embodiments of the present disclosure, the grayscale voltage adjusting portion may be a specialized hardware device and configured to achieve some or all the functions of the grayscale voltage adjusting portion. For example, the grayscale voltage adjusting portion may be a circuit board or a combination of a plurality of circuit boards and is configured to realize the above functions. In the embodiment of the present disclosure, the circuit board or the combination of the plurality of circuit boards may include: (1) one or more processors; (2) one or more non-transitory computer readable memories connected with the processor; and (3) processor executable firmware stored in the memory.

For example, in the LCD employing the driver IC bonded by COG manner, the problem of light leakage caused by bonding can all be solved by the LCD and/or the driving method of the LCD provided by the embodiment of the present disclosure.

The following statements should be understood:

(1) Unless otherwise defined, the same reference numeral represents the same meaning in the embodiments of the present disclosure and accompanying drawings.

(2) The accompanying drawings involve only the structure(s) in connection with the embodiment(s) of the present disclosure, and other structure(s) can be referred to common design(s).

(3) For the purpose of clarity only, in accompanying drawings for illustrating the embodiment(s) of the present disclosure, the thickness and size of a layer or a structure can be enlarged. However, it should understood that, in the case in which a part or element such as a layer, film, area, substrate or the like is referred to be "on" or "under" another part or element, it can be directly on or under the another part or element or a part or element is interposed therebetween.

(4) In case of no conflict, features in an embodiment or in different embodiments can be combined.

What have been described above are only specific implementations of the present disclosure, the protection scope of the present disclosure is not limited thereto. Any changes or substitutions easily occur to those skilled in the art within the technical scope of the present disclosure should be covered in the protection scope of the present disclosure. Therefore, the protection scope of the present disclosure should be based on the protection scope of the claims.

What is claimed is:

1. A liquid crystal display (LCD), comprising:
    an LCD panel, comprising a deformation area formed by bonding of a driver integrated circuit (IC), the deformation area comprising a first subpixel;
    a grayscale voltage output portion, configured to output a first grayscale voltage to the first subpixel; and
    a grayscale voltage adjusting portion, configured to adjust the first grayscale voltage into a second grayscale voltage, so that a brightness of the first subpixel at the second grayscale voltage is less than a brightness of the first subpixel at the first grayscale voltage,
    the driver IC is disposed on the LCD panel, and an orthographic projection of the driver IC on the LCD panel is located outside an orthographic projection of the first subpixel on the LCD panel, and
    an orthographic projection of the deformation area surrounds the orthographic projection of the driver IC,
    wherein the deformation area comprises a plurality of deformation sub-areas, a same deformation sub-area has a same deformation degree, and the grayscale voltage adjusting portion is configured to allow the second grayscale voltages of the first subpixels at a same grayscale in a same deformation sub-area to be same, and allow the second grayscale voltages of the first subpixels at a same grayscale in different deformation sub-areas to be different, and
    in the plurality of deformation sub-areas, at least one of the plurality of deformation sub-areas surrounds another one of the plurality of deformation sub-areas,
    wherein at least one of the plurality of deformation sub-areas is a closed loop, the closed loop comprises a first portion and a second portion that are located at opposite sides of the driver IC, the LCD panel comprises an edge beside which the driver IC is located, and the first portion is closer to the edge of the LCD panel than the second portion, a size of the driver IC in a first direction is greater than that of the driver IC in a second direction, the second direction intersects with the first direction, and a size of the second portion in the second direction is greater than that of the first portion in the second direction.

2. The LCD according to claim 1, wherein the grayscale voltage adjusting portion is configured to allow the brightness of the first subpixel at the second grayscale voltage to be minimum.

3. The LCD according to claim 1, wherein the LCD panel further comprises a non-deformation area, the non-deformation area comprises a second subpixel, and the grayscale voltage adjusting portion is configured to allow the brightness of the first subpixel at the second grayscale voltage to be equal to or close to a brightness of the second subpixel at the first grayscale voltage.

4. The LCD according to claim 3, wherein the grayscale voltage output portion is further configured to output a third grayscale voltage to the second subpixel, and the third grayscale voltage is equal to the first grayscale voltage, and if the brightness of the first subpixel at the second grayscale voltage is different from the brightness of the second subpixel at the first grayscale voltage, the grayscale voltage adjusting portion is further configured to adjust the third grayscale voltage into a fourth grayscale voltage, so that a brightness of the second subpixel at the fourth grayscale voltage is the same as the brightness of the first subpixel at the second grayscale voltage.

5. The LCD according to claim 1, wherein at least one of the plurality of deformation sub-areas is located within an area defined by an inner edge of the closed loop.

6. The LCD according to claim 1, further comprising a first subpixel coordinate recording portion of the deformation area, wherein the first subpixel coordinate recording portion of the deformation area is configured to record a coordinate of the first subpixel in the deformation area.

7. The LCD according to claim 1, further comprising a memory, wherein the memory is configured to store the second grayscale voltage corresponding to the first grayscale voltage, the second grayscale voltage is a grayscale voltage at which the brightness of the first subpixel is less than the brightness of the first subpixel at the first grayscale voltage, and the grayscale voltage is obtained by an offline test.

8. The LCD according to claim 1, wherein the LCD panel comprises an array substrate on which the driver IC is bonded, the driver IC is bonded to an area outside a pixel region of the array substrate.

9. The LCD according to claim 1, wherein the second subpixel, the first subpixel, and the driver IC are arranged in sequence.

10. The LCD according to claim 5, wherein deformation degrees are gradually decreased from an area close to the driver IC to an area away from the driver IC.

* * * * *